United States Patent
Gomila et al.

(10) Patent No.: US 6,907,079 B2
(45) Date of Patent: Jun. 14, 2005

(54) DEBLOCKING FILTER CONDITIONED ON PIXEL BRIGHTNESS

(75) Inventors: Cristina Gomila, Princeton, NJ (US); Jill MacDonald Boyce, Manalapan, NJ (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 36 days.

(21) Appl. No.: 10/364,430

(22) Filed: Feb. 11, 2003

(65) Prior Publication Data

US 2003/0206664 A1 Nov. 6, 2003

Related U.S. Application Data

(60) Provisional application No. 60/377,061, filed on May 1, 2002.

(51) Int. Cl.[7] .................................................. H04B 1/66
(52) U.S. Cl. .......................... 375/240.25; 375/240.24; 375/240.12; 375/240.14; 375/240.26; 375/240.18; 382/233; 382/236; 382/238; 382/239; 382/248; 382/251
(58) Field of Search ....................... 375/240.25, 240.24, 375/240.12, 240.14, 240.26, 240.18, 240.29, 240.15, 240.16; 382/233, 236, 238, 239, 248, 251; 348/699

(56) References Cited

U.S. PATENT DOCUMENTS

| | | | | |
|---|---|---|---|---|
| 5,126,841 A | * | 6/1992 | Tanaka et al. | 375/240.16 |
| 5,715,008 A | * | 2/1998 | Sekiguchi et al. | 375/240.15 |
| 5,959,672 A | * | 9/1999 | Sasaki | 375/240.23 |
| 5,987,180 A | | 11/1999 | Reitmeier | 382/236 |
| 6,160,503 A | | 12/2000 | Andrews et al. | 341/94 |
| 6,188,799 B1 | | 2/2001 | Tan et al. | 382/260 |
| 6,215,425 B1 | | 4/2001 | Andrews et al. | 341/94 |
| 6,225,923 B1 | | 5/2001 | Andrews | 341/94 |
| 6,240,135 B1 | | 5/2001 | Kim | 375/240.01 |
| 6,360,024 B1 | | 3/2002 | Tan et al. | 382/260 |
| 6,404,917 B1 | * | 6/2002 | Kondo et al. | 382/166 |
| 6,434,197 B1 | | 8/2002 | Wang et al. | 375/240.29 |
| 2001/0020906 A1 | | 9/2001 | Andrews et al. | 341/94 |

* cited by examiner

Primary Examiner—Shawn S. An
(74) Attorney, Agent, or Firm—Joseph S. Tripoli; Ronald H. Kurdyla; Guy H. Eriksen

(57) ABSTRACT

An encoder, decoder, and corresponding method are disclosed for encoding pixel data as a plurality of block transform coefficients and decoding encoded block transform coefficients to provide reconstructed pixel data, the encoder and/or decoder includes a conditional deblocking filter for filtering only block transitions meeting pre-selected pixel brightness level criteria, where the conditional deblocking filter method includes receiving at least one first pixel adjacent to a block transition, providing a signal indicative of the brightness of the at least one first pixel, comparing the brightness signal with at least one of an upper brightness threshold and a lower brightness threshold, and conditionally filtering a plurality of adjacent pixels including the first pixel at the block transition in response to the brightness comparison.

15 Claims, 3 Drawing Sheets

DEBLOCKING FILTER CONDITIONED ON PIXEL BRIGHTNESS

CROSS-REFERENCE TO RELATED APPLICATION

This application claims the benefit of U.S. Provisional Patent Application Ser. No. 60/377,061, entitled "Deblocking Filter Simplification Based On Pixel Brightness" and filed May 1, 2002, which is incorporated herein by reference in its entirety.

FIELD OF THE INVENTION

The present invention is directed towards video coders and decoders (collectively "CODECs"), and in particular, towards video CODECs with deblocking filters.

BACKGROUND OF THE INVENTION

Video data is generally processed and transferred in the form of bit streams. A video encoder generally applies a block transform coding, such as a discrete cosine transform ("DCT"), to compress the raw data. A corresponding video decoder generally decodes the block transform encoded bit stream data, such as by applying an inverse discrete cosine transform ("IDCT").

Deblocking filters are often used in conjunction with block-based digital video compression systems. A deblocking filter can be applied inside the compression loop, where the filter is applied at the encoder and at the decoder. Alternatively, a deblocking filter can be applied after the compression loop at only the decoder. A typical deblocking filter works by applying a low-pass filter across the edge transition of a block where block transform coding (e.g., DCT) and quantization was performed. Deblocking filters can reduce the negative visual impact known as "blockiness" in decompressed video, but generally require a significant amount of computational complexity at the video decoder and/or encoder.

SUMMARY OF THE INVENTION

These and other drawbacks and disadvantages of the prior art are addressed by a system and method for a deblocking filter conditioned on pixel brightness.

An encoder and decoder are provided for encoding pixel data as a plurality of block transform coefficients and decoding encoded block transform coefficients to provide reconstructed pixel data, the encoder and/or decoder includes a conditional deblocking filter for filtering only block transitions meeting pre-selected pixel brightness level criteria.

A corresponding method for a conditional deblocking filter includes receiving at least one first pixel adjacent to a block transition, providing a signal indicative of the brightness of the at least one first pixel, comparing the brightness signal with at least one of an upper brightness threshold and a lower brightness threshold, and conditionally filtering a plurality of adjacent pixels including the first pixel at the block transition in response to the brightness comparison.

These and other aspects, features and advantages of the present invention will become apparent from the following description of exemplary embodiments, which is to be read in connection with the accompanying drawings.

BRIEF DESCRIPTION OF THE DRAWINGS

The present invention encompasses teaches a deblocking filter conditioned on pixel brightness in accordance with the following exemplary figures, in which.

DETAILED DESCRIPTION OF PREFERRED EMBODIMENTS

Figure 1:
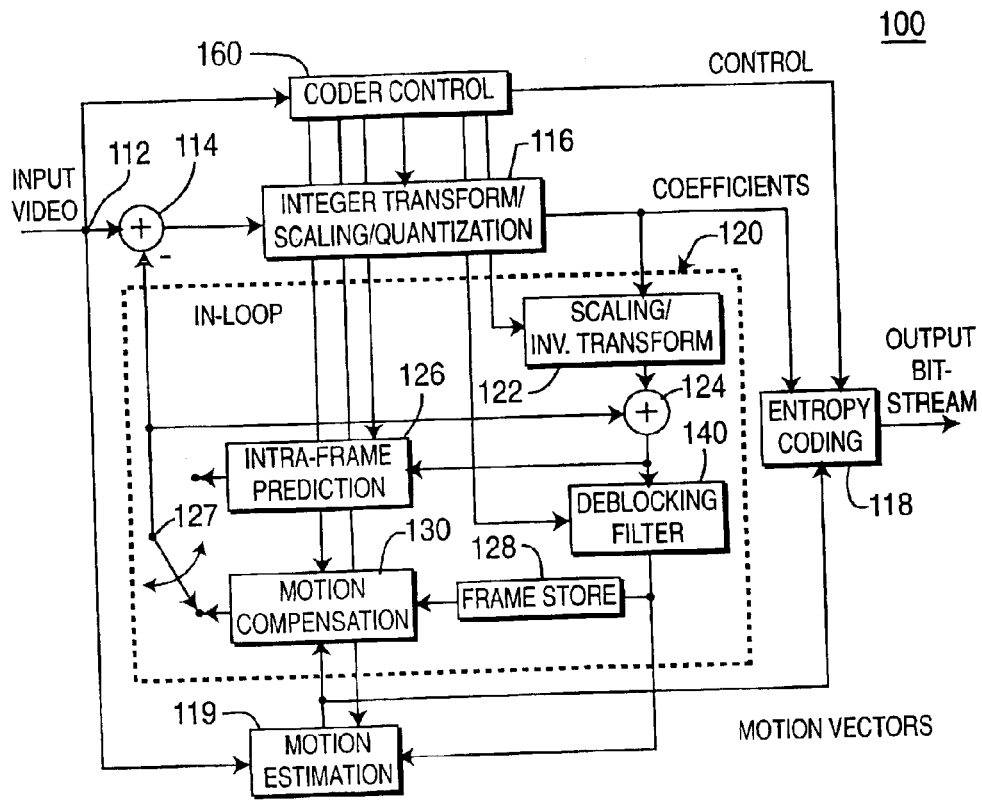
FIG. 1 shows a block diagram for an exemplary encoder having an in-loop deblocking filter conditioned on pixel brightness.

Implementation of a deblocking filter generally requires a significant amount of computational complexity at the video decoder and/or encoder. Determination of whether or not to filter a particular edge transition and the particular filter used to perform the filtering operation each have a large impact on both the computation complexity and the perceived visual quality. Implementation of a deblocking filter in a block-based digital video compression system can be simplified by deciding whether or not to apply a low-pass filter at a block transition based on the brightness level of the pixels at the transition. Thus, the computational complexity can be reduced by omitting application of a deblocking filter to transitions were it would not improve the perceived visual quality. The present invention reduces the computational complexity of a deblocking filter without significantly impacting the perceived visual quality by deciding whether or not to apply a low-pass or deblocking filter at a block transition based on the brightness levels of the pixels at the transition.

In the ITU-T Recommendation H.263 video compression standard, the strength of the particular deblocking filter to be applied depends upon the quantization parameter used to encode a given macroblock. In the proposed ITU-T Recommendation H.264 I ISO/IEC14496-10 AVC video compression standard (hereinafter referred to as "H.264/AVC"), several factors are used to determine whether or not to filter a transition and the strength of the filter to apply. These factors include whether the block was intra-coded or inter-coded, whether non-zero coefficients were present in the block, the magnitude of the difference in pixel values across the edge, and the magnitude of the difference in motion vectors of blocks across the edge. Prior approaches have not considered the brightness value of the pixels themselves in the determination of whether or not to filter a block transition and/or determination of the strength of the filter to apply.

The following description merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

As shown in FIG. 1, an exemplary encoder having an in-loop deblocking filter conditioned on pixel brightness is indicated generally by the reference numeral 100. The encoder 100 includes a video input terminal 112 that is coupled in signal communication to a positive input of a summing block 114. The summing block 114 is coupled, in turn, to a function block 116 for implementing an integer transform to provide coefficients. The block 116 is coupled to an entropy coding block 118 for implementing entropy coding to provide an output bitstream. The block 116 is further coupled to an in-loop portion 120 at a scaling and inverse transform block 122. The block 122 is coupled to a summing block 124, which, in turn, is coupled to an intra-frame prediction block 126. The intra-frame prediction block 126 is switchably coupled to a switch 127, which, in turn, is coupled to a second input of the summing block 124 and to an inverting input of the summing block 114.

The output of the summing block 124 is coupled to a conditional deblocking filter 140. The deblocking filter 140 is coupled to a frame store 128. The frame store 128 is coupled to a motion compensation block 130, which is coupled to a second alternative input of the switch 127. The video input terminal 112 is further coupled to a motion estimation block 119 to provide motion vectors. The deblocking filter 140 is coupled to a second input of the motion estimation block 119. The output of the motion estimation block 119 is coupled to the motion compensation block 130 as well as to a second input of the entropy coding block 118.

The video input terminal 112 is further coupled to a coder control block 160. The coder control block 160 is coupled to control inputs of each of the blocks 116, 118, 119, 122, 126, 130, and 140 for providing control signals to control the operation of the encoder 100.

Figure 2:
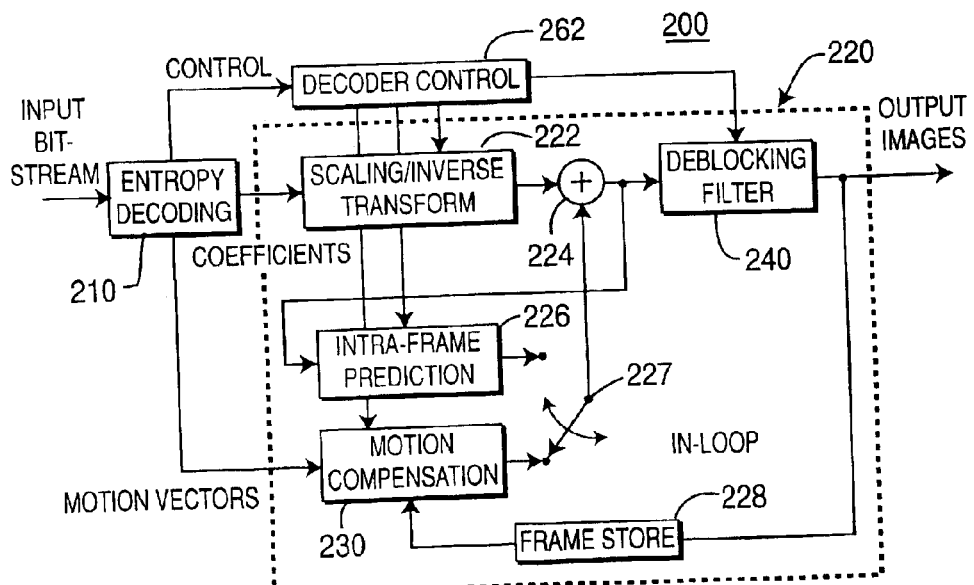
FIG. 2 shows a block diagram for an exemplary decoder having an in-loop deblocking filter conditioned on pixel brightness and usable with the encoder of FIG. 1.

Turning to FIG. 2, an exemplary decoder having an in-loop deblocking filter conditioned on pixel brightness is indicated generally by the reference numeral 200. The decoder 200 includes an entropy decoding block 210 for receiving an input bitstream. The decoding block 210 is coupled for providing coefficients to an in-loop portion 220 at a scaling and inverse transform block 222. The block 222 is coupled to a summing block 224, which, in turn, is coupled to an intra-frame prediction block 226. The intra-frame prediction block 226 is switchably coupled to a switch 227, which, in turn, is coupled to a second input of the summing block 224.

The output of the summing block 224 is coupled to a conditional deblocking filter 240 for providing output images. The deblocking filter 240 is coupled to a frame store 228. The frame store 228 is coupled to a motion compensation block 230, which is coupled to a second alternative input of the switch 227. The decoding block 210 is further coupled for providing motion vectors to a second input of the motion compensation block 230.

The entropy decoding block 210 is further coupled for providing input to a decoder control block 262. The decoder control block 262 is coupled to control inputs of each of the blocks 222, 226, 230, and 240 for communicating control signals and controlling the operation of the decoder 200.

Figure 3:
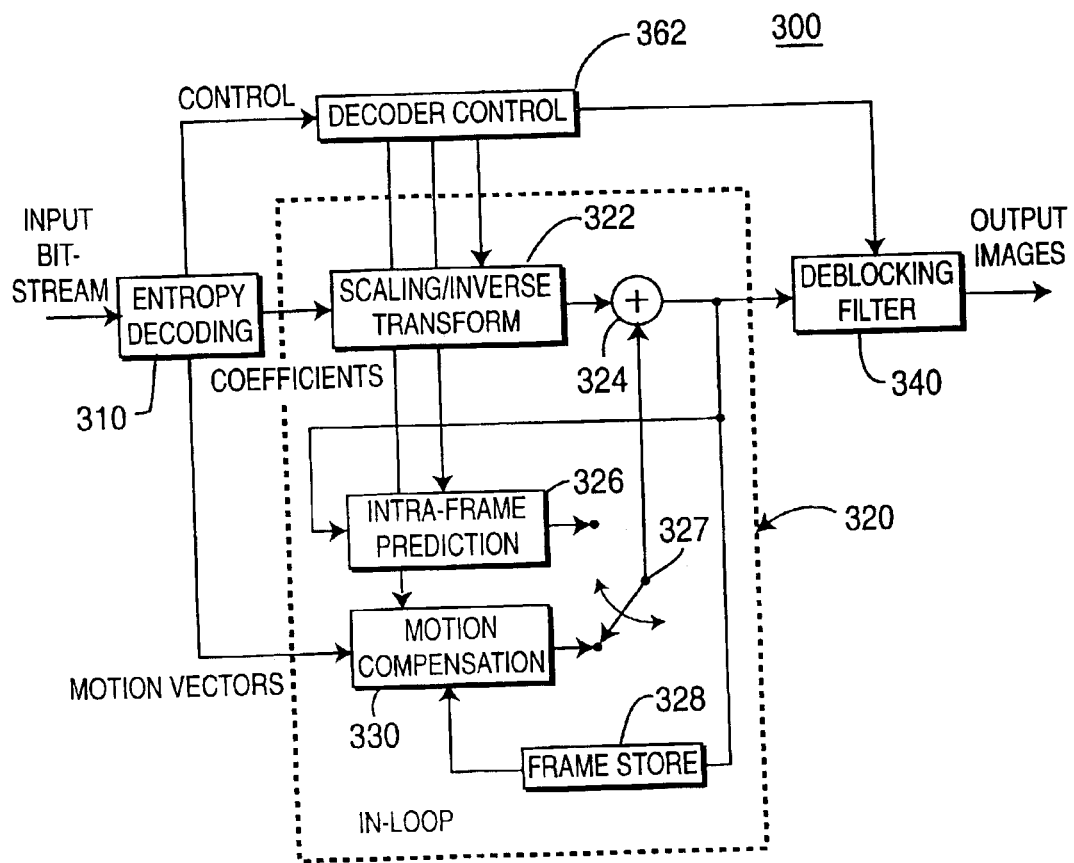
FIG. 3 shows a block diagram for an exemplary decoder having a post-processing deblocking filter conditioned on pixel brightness.

Turning now to FIG. 3, an exemplary decoder having a post-processing deblocking filter conditioned on pixel brightness is indicated generally by the reference numeral 300. The decoder 300 includes an entropy decoding block 310 for receiving an input bitstream. The decoding block 310 is coupled for providing coefficients to an in-loop portion 320 at a scaling and inverse transform block 322. The block 322 is coupled to a summing block 324, which, in turn, is coupled to an intra-frame prediction block 326. The intra-frame prediction block 326 is switchably coupled to a switch 327, which, in turn, is coupled to a second input of the summing block 324.

The output of the summing block 324 is coupled to a conditional deblocking filter 340 for providing output images. The summing block 324 is further coupled to a frame store 328. The frame store 328 is coupled to a motion compensation block 330, which is coupled to a second alternative input of the switch 327. The entropy encoding block 310 is further coupled for providing motion vectors to a second input of the motion compensation block 330.

The entropy decoding block 310 is further coupled for providing input to a decoder control block 362. The decoder control block 362 is coupled to control inputs of each of the blocks 322, 326, 330, and 340 for communicating control signals and controlling the operation of the decoder 300.

Figure 4:
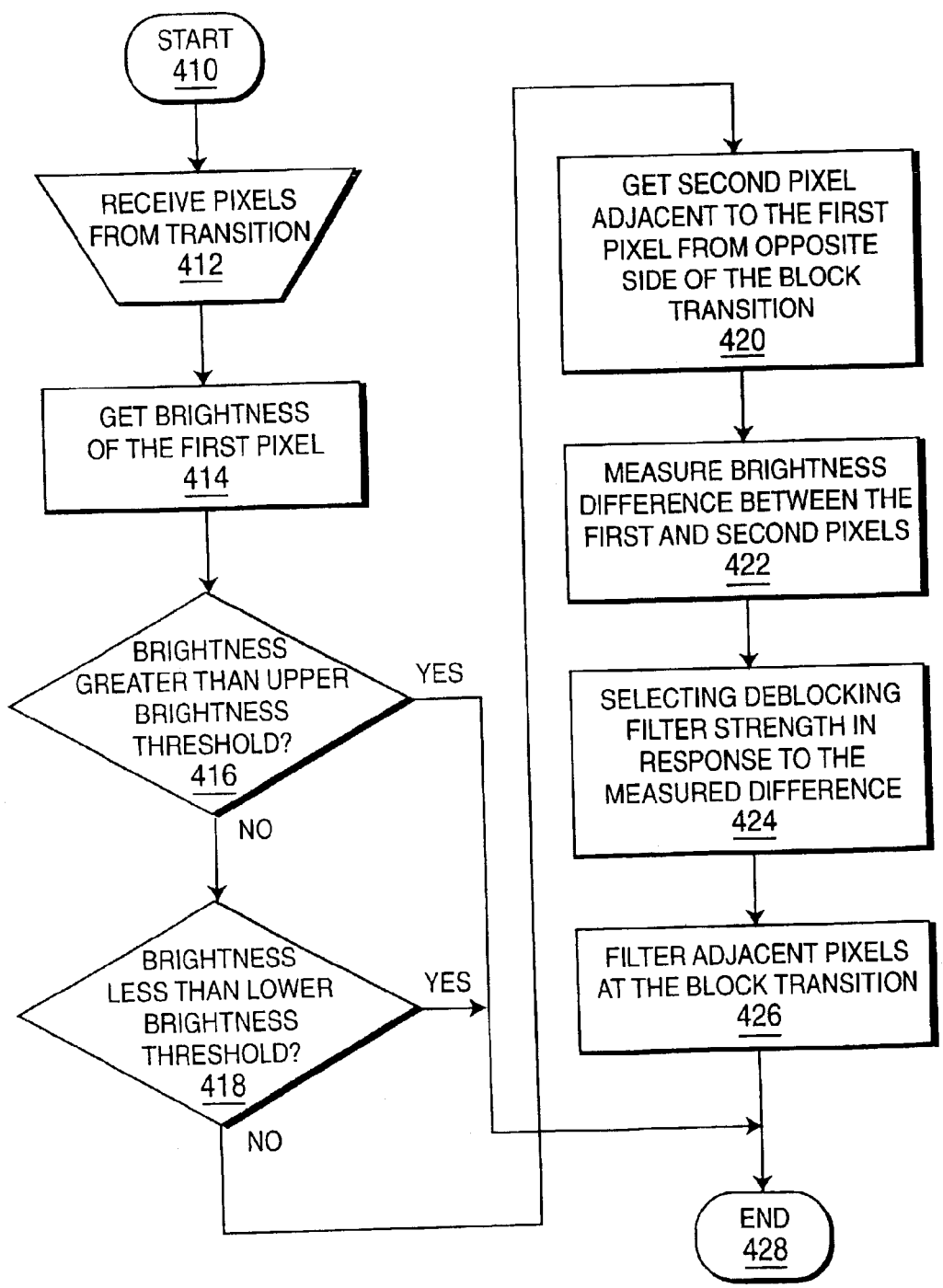
FIG. 4 shows flow diagram for an in-loop deblocking filter conditioned on pixel brightness in accordance with the principles of the present invention.

As shown in FIG. 4, the processes for an exemplary deblocking filter responsive to pixel brightness is indicated generally by the reference numeral 400. The process 400 includes a start step 410 that passes control to an input step 412 for receiving at least one first pixel adjacent to a block transition. The input step 412 passes control to step 414 for providing a signal indicative of the brightness of the at least one first pixel. The step 414 passes control to a decision step 416 for comparing the brightness signal with an upper brightness threshold. If the brightness is greater than the upper threshold, no deblock filtering is performed and control passes to an end step 428. Otherwise, the step 416 passes control to a decision step 418 for comparing the brightness signal with a lower brightness threshold. If the brightness is less than the lower threshold, no deblock filtering is performed and control passes to an end step 428. Otherwise, the step 418 passes control to a function step 420 for receiving at least one second pixel adjacent to the first pixel and disposed on an opposite side of the block transition.

The step 420 passes control to a function step 422 for measuring a brightness level difference between the first and second pixels. The step 422, in turn, passes control to a function step 424 for selecting a deblocking filter strength to be applied in response to the measured difference. The step 424 passes control to a function step 426 for conditionally filtering a plurality of adjacent pixels including the first pixel at the block transition in response to the brightness comparison. Finally, the step 426 passes control to the end step 428.

In operation of embodiments of the present invention, the computational complexity of a deblocking filter in an image or video compression system is reduced by not performing deblocking filtering and/or reducing the filter strength for any given block in response to conditions applied to measures of the brightness values of the pixels at or near the block boundary transitions. Application of the deblocking filter is eliminated, or the filter strength reduced, for those transitions that fall in a range of values too dark or too bright to be easily differentiated by natural human vision. Thus, for these regions, application of a deblocking filter would have required additional computations but would not have sufficiently improved the perceived video quality to human viewers.

In a preferred embodiment, a deblocking filter is not applied for pixel brightness levels below a minimum threshold or above a maximum threshold. In algebraic notation, the deblocking filter is not applied for pixel brightness levels, p, where $p<Y_{min}$ or $p>Y_{max}$, and where $Y_{min}$ and $Y_{max}$ are the respective minimum and maximum brightness level thresholds. For computational simplicity the value of p can be based on an individual pixel, or it can be based on an average of pixels across the transition. Alternatively, the threshold test can be applied separately for each pixel in a transition, and the application of the deblocking filter skipped only for blocks where all pixels at the transition exceed $Y_{max}$, or where all pixels at the transition are lower than $Y_{min}$.

In another embodiment, the decision to filter or not to filter can be incorporated into a system that uses other criteria to make deblocking filter decisions, such as those used in the H.264/AVC compression standard, for example. When the principles of the present invention are applied to a H.264/AVC JM 1.9 compliant system, for example, the present filtering decision is applied to the line-based filtering steps of the JM 1.9 deblocking filter. Here, the deblocking algorithm proceeds in three steps when it is applied to a transition. In one step the algorithm determines whether or not the current transition will be filtered. This decision relies on line-based criteria as well as on other block-based parameters previously evaluated. For those cases where it decides to filter, there is another step in which the filter to be applied is selected. An additional step begins the filtering process itself, where the value of a certain number of pixels surrounding the block edge is modified in order to smooth this transition. A set of eight pixels involved in the filtering of a transition for this exemplary embodiment is denoted by the following notation:

| $p_3$ | $p_2$ | $p_1$ | $p_0$ | $q_0$ | $q_1$ | $q_2$ | $q_3$ |
|---|---|---|---|---|---|---|---| where the block edge is located between $p_0$ and $q_0$.

In this embodiment, this criterion is only evaluated on one pixel around the transition where:

$$p_0 > Y_{min} \text{ AND } p_0 < Y_{max}$$

Only those transitions that verify both the basic and these additional conditions will be filtered. Good experimental results have been achieved with thresholds of $Y_{min}=64$ and $Y_{max}=232$.

This new criterion for conditional deblocking filters increases the number of operations involved in the decision process, but achieves an overall reduction in computational complexity because of the computations saved when the decision is made not to filter the line transition. Experiments also have shown that the reduction in operations comes without a significant loss of visual quality.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, embodiments of the present invention are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which embodiments of the present invention are programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

What is claimed is:

1. A method for blocking pixel data processed with block transformations, the method comprising:

receiving at least one first pixel adjacent to a block transition;

providing a signal indicative of the brightness of the at least one first pixel;

receiving (420) at least one second pixel adjacent to the first pixel and disposed on an opposite side of the block transition;

measuring (422) a brightness level difference between the first and second pixels;

selecting (424) a deblocking filter strength to be applied in response to the measured difference;

comparing the brightness signal with at least one of an upper brightness threshold and a lower brightness threshold; and conditionally filtering a plurality of adjacent pixels including the first pixel at the block transition in response to the brightness comparison.

2. A method as defined in claim 1 wherein there are approximately four first and approximately four second pixels received for a given block transition, said pixels being disposed along a line that crosses the block transition.

3. A method as defined in claim 1 wherein the value of the lower brightness threshold is approximately 64 and the value of the upper brightness threshold is approximately 232.

4. A method as defined in claim 1 wherein the step of conditionally filtering is applied separately for each pixel adjacent to a transition and filtering is omitted only for blocks where all pixels at the transition exceed the upper brightness threshold or where all pixels at the transition are less than the lower brightness threshold.

5. A method as defined in claim 1, further comprising averaging a plurality of adjacent pixels including the first pixel wherein the provided brightness signal is indicative of the average brightness of the plurality of adjacent pixels.

6. A method as defined in claim 5 wherein filtering is omitted only for blocks where the average pixel brightness at the transition exceeds the upper brightness threshold or where the average pixel brightness at the transition is less than the lower brightness threshold.

7. A method as defined in claim 1 wherein the conditional filtering is line-based.

8. A method as defined in claim 1 wherein the conditional filtering is block-based.

9. A method as defined in claim 1, further comprising: encoding the pixel data as a plurality of block transform coefficients; and conditionally deblocking the pixel data within a feedback loop.

10. A method as defined in claim 1, further comprising: decoding the pixel data from a plurality of block transform coefficients; and conditionally deblocking the pixel data within a feedback loop.

11. A method as defined in claim 1, further comprising: decoding the pixel data from a plurality of block transform coefficients; and conditionally deblocking the pixel data after a feedback loop.

12. An encoder for encoding pixel data as a plurality of block transform coefficients, the encoder including a conditional deblocking filter for filtering only block transitions meeting at least one pixel brightness level threshold, comprising:

receiver means for receiving at least one first pixel adjacent to a block transition;

signal means responsive to the receiver means for providing a signal indicative of the brightness of the at least one first pixel;

second receiver means for receiving at least one second pixel adjacent to the first pixel and disposed on an opposite side of the block transition;

measurement means for measuring a brightness level difference between the first and second pixels;

filter strength means for selecting a deblocking filter strength to be applied in response to the measured difference;

comparison means responsive to the signal means for comparing the brightness signal with at least one of an upper brightness threshold and a lower brightness threshold; and filter means responsive to the comparison means for conditionally filtering a plurality of adjacent pixels including the first pixel at the block transition in response to the comparison means.

13. A decoder for decoding encoded block transform coefficients to provide reconstructed pixel data, the decoder including a conditional deblocking filter for filtering only block transitions meeting at least one pixel brightness threshold, comprising:

receiver means for receiving at least one first pixel adjacent to a block transition;

signal means responsive to the receiver means for providing a signal indicative of the brightness of the at least one first pixel;

second receiver means for receiving at least one second pixel adjacent to the first pixel and disposed on an opposite side of the block transition;

measurement means for measuring a brightness level difference between the first and second pixels;

filter strength means for selecting a deblocking filter strength to be applied in response to the measured difference;

comparison means responsive to the signal means for comparing the brightness signal with at least one of an upper brightness threshold and a lower brightness threshold; and filter means responsive to the comparison means for conditionally filtering a plurality of adjacent pixels including the first pixel at the block transition in response to the comparison means.

14. A decoder as defined in claim 13 wherein the conditional deblocking filter is disposed within a feedback loop for deblocking during motion compensation.

15. A decoder as defined in claim 13 wherein the conditional deblocking filter is disposed after a feedback loop for deblocking after motion compensation.

* * * * *

UNITED STATES PATENT AND TRADEMARK OFFICE
CERTIFICATE OF CORRECTION

PATENT NO. : 6,907,079 B2  
APPLICATION NO. : 10/364430  
DATED : June 14, 2005  
INVENTOR(S) : Cristina Gomila and Jill MacDonald Boyce Page 1 of 1

It is certified that error appears in the above-identified patent and that said Letters Patent is hereby corrected as shown below:

Claims  
Column 7, line 9 in claim 1: the word, "blocking",  
should read -- deblocking --.

Signed and Sealed this  
Eighth Day of December, 2015

Michelle K. Lee  
*Director of the United States Patent and Trademark Office*